Dec. 22, 1936.  C. F. HIRSHFELD  2,065,134
WHEEL
Filed Oct. 22, 1934
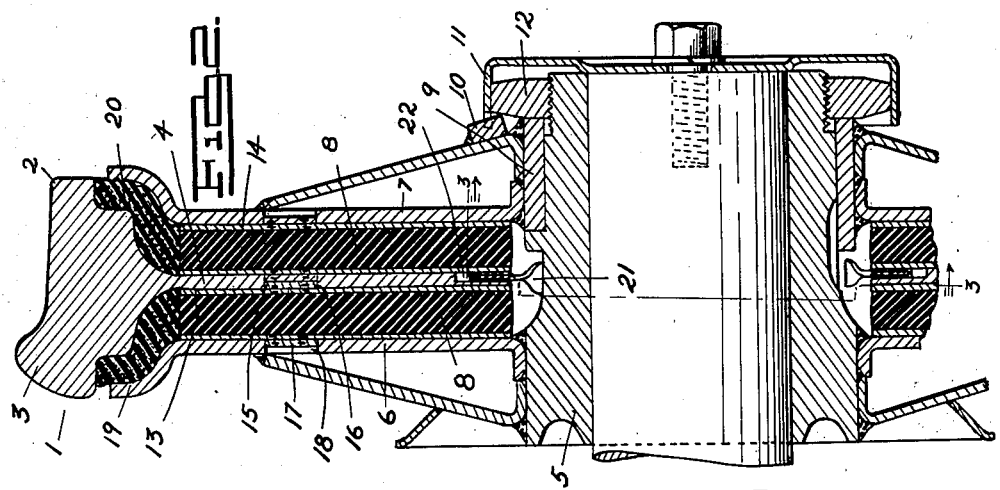
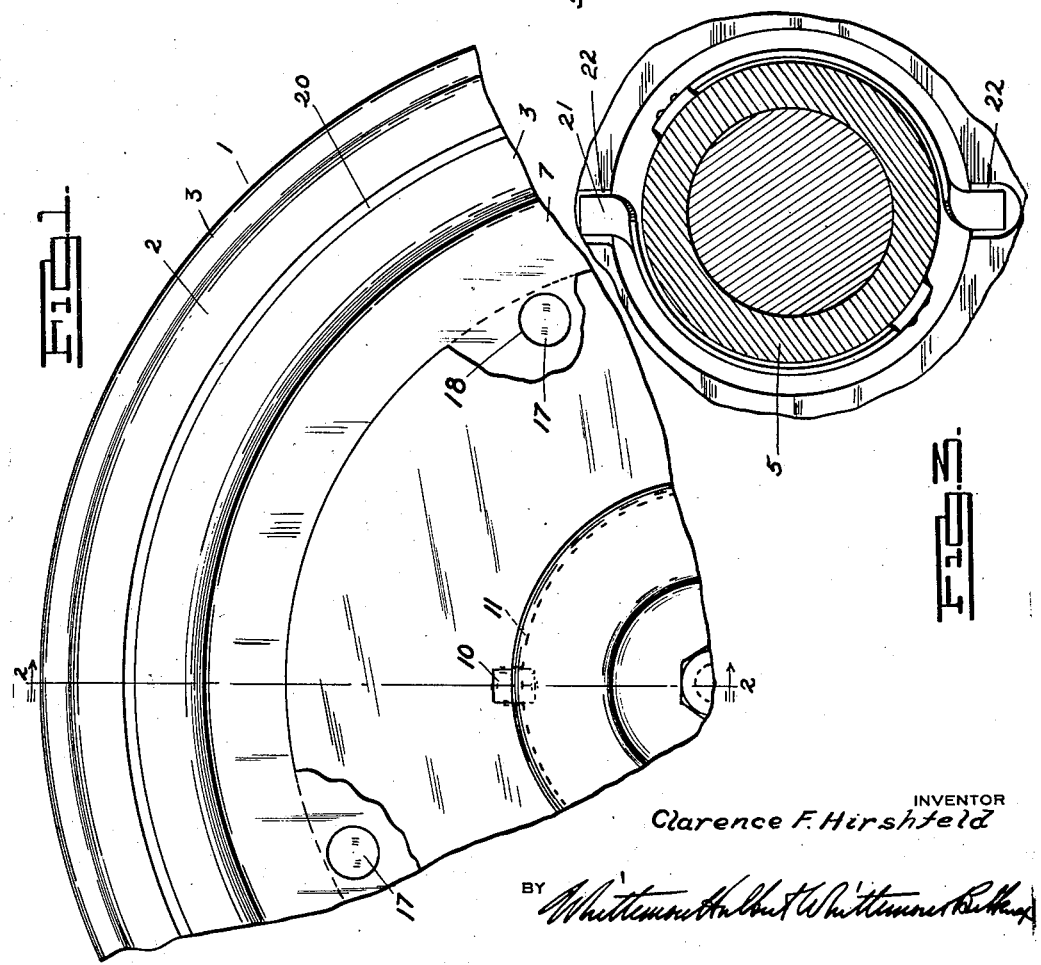
INVENTOR
Clarence F. Hirshfeld
BY
ATTORNEYS Patented Dec. 22, 1936

2,065,134

UNITED STATES PATENT OFFICE 2,065,134

WHEEL

Clarence F. Hirshfeld, Detroit, Mich., assignor, by mesne assignments, to Transit Research Corporation, New York, N. Y., a corporation of New York Application October 22, 1934, Serial No. 749,449

6 Claims. (Cl. 295—7)

This invention relates to wheels for rail vehicles and particularly to that type of wheel wherein the tire is supported from its hub through the medium of elastic shear elements.

The object of this invention is to provide a wheel which will be quiet in operation and which will have sufficient resiliency to constitute an intrinsic part of the vehicle springing system.

A specific object of this invention is to provide a tire of sturdy construction which will not distort or break under severe usage, by forming a deep webbing integral therewith, this webbing constituting the plate means for directly receiving the loading from the shear elements.

Another specific object is to effectively sound insulate the tire by packing thick, soft rubber on both sides thereof and located radially between the wear surface and the shear elements as a means for absorbing all vibrations of short wave length which the tire would otherwise broadcast as noise, following rail impacts.

Another object is to employ radial plate members resting directly on the wheel hub as the means for transferring the loading of the hub to the elastic shear elements and to extend these plates by a sufficient amount to constitute retaining walls for the aforementioned soft rubber on the sides of the tire.

Other objects and advantages will become hereinafter more fully apparent as reference is had to the accompanying drawing, wherein:

Figure 1 is a side elevation, partly in section, of a wheel showing an embodiment of my invention;

Figure 2 is a cross section on the line 2—2 of Figure 1;

Figure 3 is a cross section on the line 3—3 of Figure 2.

The wheel is designed for use with rail vehicles and comprises the endless rail contacting tire 1 having the circular tread surface 2 and the integral annular flange 3. Radiating inwardly from and toward the hub and in the median plane of the rim is the stiff plate member or web 4 which is integral with the tire and reinforces the same to such an extent that the tire will not distort or break under severe usage and the tire and the plate member may be formed of a casting.

The wheel also comprises the hub 5 from which radiate the plate members 6 and 7. For supporting the tire from the hub, the plate member 4 is positioned to reside between the plate members 6 and 7 and elastic cushioning means in the nature of the rubber rings 8 are positioned between and secured to the plate member 4 and each of the plate members 6 and 7. The plate member 6 is fixedly secured directly to the hub 5 and the plate member 7 is fixedly secured directly to the sleeve 9, which latter is mounted directly upon the hub. The sleeve is held from rotation relative to the hub as by forming the sleeve with the axially extending projections 10 which extend through correspondingly shaped slots in the annular flange 11 upon the hub. The nut 12 threaded upon the end of the hub 5 and abutting the sleeve 9 is adapted to urge the plate member 7 toward the plate member 6.

Each of the rubber rings 8 is arranged between and preferably vulcanized to the inner and outer plate members 13 and 14 respectively. Each of the inner plate members 13 is positioned relative to the tire supporting plate member 4 by the dowels 15 fixedly secured to these plate members and fitting in the openings 16 formed in the plate member 4. Each of the outer plate members 14 is positioned relative to its associated plate member 6 or 7 by the dowels 17, which are fixedly secured to the outer plate members and fit in the openings 18 formed in the plate members 6 and 7. The rubber rings 8 and the plate members 13 and 14 terminate short of the tire 1 and the hub 5 and the sleeve 9. The plate member 4 also terminates short of the hub 5. The arrangement is such that the plate member 4 may move radially relative to the hub and the rubber rings transmit the loading from the hub to the tire in resilient shear.

For the purpose of damping the noise from the tire 1 during the operation thereof, the plate members 6 and 7 are extended outwardly beyond the rubber shear rings 8 and the extensions or outer edge portions 19 of these plate members are oppositely flared to contain the inner portion of the tire 1. Also sound deadening material, which is softer than the rubber rings 8, is located outwardly of these rubber rings and partially envelopes the tire. This sound deadening material comprises the sponge rubber rings 20 contacting with and covering the interior surfaces and sides of the tire and retained in place by the flared extensions or outer edge portions 19 of the plate members 6 and 7. The sound deadening elements cover a substantial portion of the side surfaces of the tire and are preferably located within the confines of the tire and while these elements are under slight compression they are substantially unrestrained as to flow and are free of load carrying, since they are formed of sponge rubber.

For electrically connecting the rim to the hub, there are the electrical conductors 21 which are fixedly secured to the hub 5 and the plate member 4, these conductors extending into pockets 22 formed in the inner edge portion of the plate member.

From the above description, it will be readily seen that I have provided an improved construction of wheel for rail vehicles of that type in which the tire is supported from the hub by elastic shear elements. It will also be seen that I have provided a wheel which will be quiet in operation in that the tire is effectively sound insulated. It will be further seen that I have provided in the wheel a sturdy construction of tire in that it is reinforced by a deep web and also that this web directly receives the loading from the shear elements of the wheel.

What I claim as my invention is:

1. In a wheel for rail vehicles, a hub, a tire, elastic means for supporting said tire from said hub in resilient shear, and a relatively softer elastic means immediately adjacent said tire and contacting the tire supporting means for damping the noise therefrom during operation.

2. In a wheel for rail vehicles, a hub, a tire, rubber shear elements for supporting said tire from said hub, and relatively softer rubber in contact with said shear elements and extending outwardly therefrom and partially enveloping said tire as a sound deadening means therefor.

3. In a wheel for rail vehicles, a hub, plate members radiating from said hub, a tire, a stiff plate member radiating inwardly from said tire toward said hub and residing between the plate members thereof, elastic cushions between said stiff plate member and each of the plate members of said hub adapted to support said tire and stiff plate member in resilient shear, and a sound deadening material on the interior surfaces and sides of said tire outwardly of said cushions, said material being substantially unrestrained as to flow whereby it is substantially free from any load carrying function.

4. In a wheel for rail vehicles, a hub, plate members radiating from said hub, a tire, a web radiating inwardly therefrom toward said hub, elastic shear elements between said web and each of said plate members for transmitting the loading from said hub to said tire in resilient shear, said plate members extending outwardly beyond said shear elements, and a relatively soft material between the outer portions of said plate members and said tire as a sound deadening means.

5. In a wheel for rail vehicles, a hub, parallel plate members radiating from said hub, a tire, a plate member radiating inwardly from said tire toward said hub, elastic cushioning elements between the plate member of said tire and each of the plate members of said hub for supporting said hub in resilient shear, the plate members of said hub extending outwardly of said elements in oppositely flared relation to contain the inner portion of said tire, and a relatively soft sound deadening material between said inner portion of said tire and the flared portions of said plate members.

6. In a wheel for rail vehicles, a hub having parallel plate members radiating therefrom, each of said members being flared at its outer edge, a tire having a plate member radiating inwardly therefrom, rubber cushioning elements between the plate member of said tire and each of the plate members of said hub for supporting said hub in resilient shear, and sponge rubber between the outer edges of said elements, the inner portion and sides of said tire and the flared edges of said plate members constituting a sound deadening means.

CLARENCE F. HIRSHFELD.